Oct. 31, 1950
A. L. HABLER
2,527,993
ICE CREAM CONE EXTENSION
Filed June 11, 1948
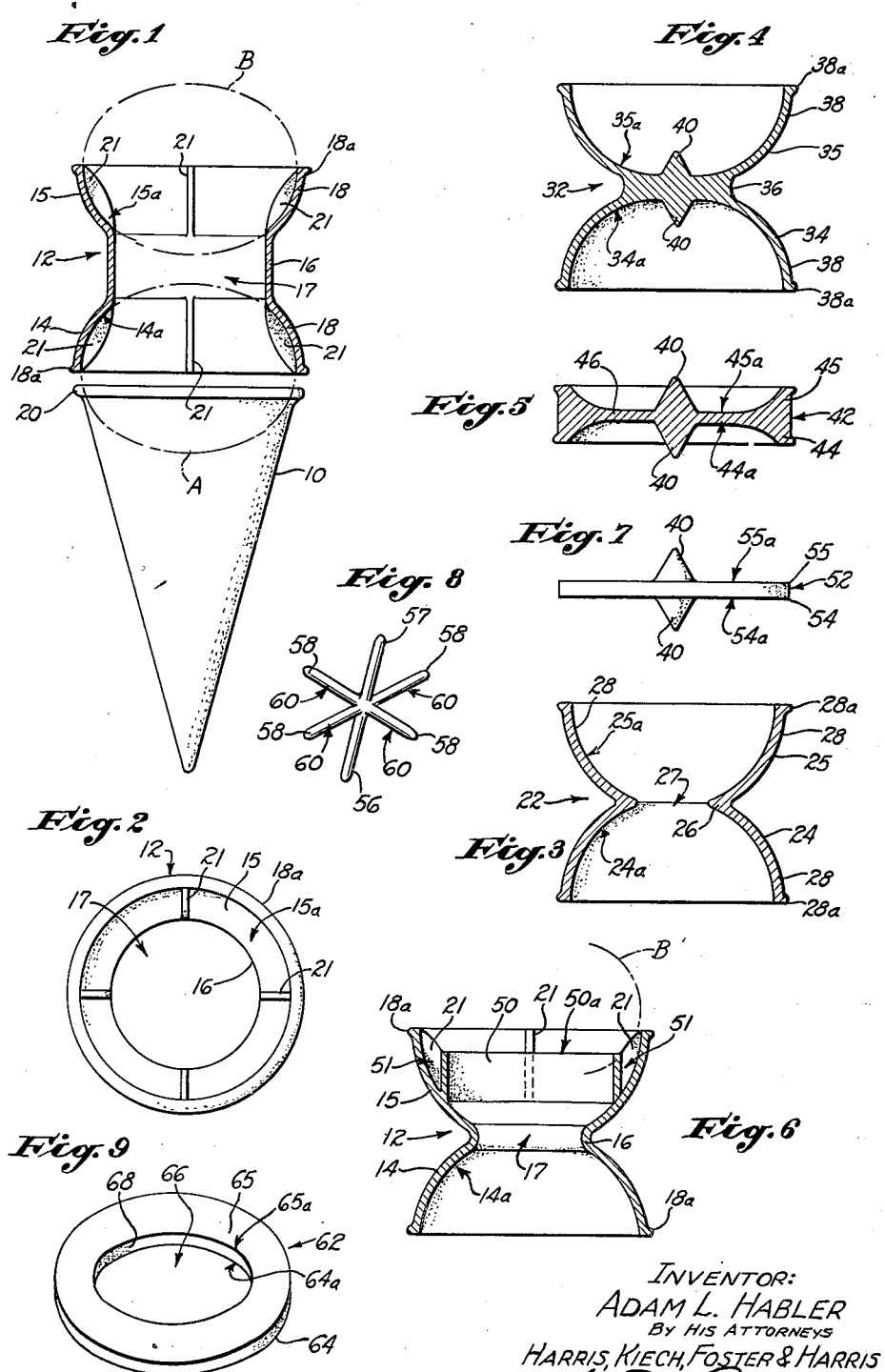
INVENTOR:
ADAM L. HABLER
BY HIS ATTORNEYS
HARRIS, KIECH, FOSTER & HARRIS Patented Oct. 31, 1950

2,527,993

UNITED STATES PATENT OFFICE 2,527,993

ICE-CREAM CONE EXTENSION

Adam L. Habler, Redondo Beach, Calif.

Application June 11, 1948, Serial No. 32,439

21 Claims. (Cl. 99—89)

This invention relates particularly to edible containers for ice cream which are commonly known as ice cream cones, and it has to do especially with an auxiliary container or support adapted for use with the conventional ice cream cone whereby the well-known "double decker" ice cream cone may be easily built up and the second scoop or ball of ice cream positively retained above the first scoop or ball of ice cream which is disposed in the mouth of the usual cone.

As is well appreciated by consumers, ice cream cones of the double decker type are made merely by placing the second scoop or ball of ice cream on the top of the first scoop or ball, and the upper ball frequently falls off while one is attempting to carry it or eat it. The general object of this invention, therefore, is to overcome such difficulty.

The principal object of this invention is to provide an auxiliary container or extension for ice cream cones which will facilitate both the building up of the common double decker ice cream cone and the handling of such cone by the consumer.

An incidental object of the invention is to provide for the mentioned double decker type of ice cream cone means which will positively retain the upper portion of ice cream in a desired position above the lower portion of ice cream.

It is also an object of the invention to provide an improvement in ice cream cones which will be attractive to the consuming public, and will not only facilitate the making of double decker ice cream cones but will stimulate sales among those who employ the present type of improvement.

Various other objects of the invention, and the features thereof, will become apparent to those skilled in the art upon reference to the accompanying drawing and the following specification, wherein various forms of the invention are disclosed for exemplary purposes.

In the drawing:

Fig. 1 is a vertical section through a double decker ice cream cone extension of this invention, the extension being illustrated in operative relation with respect to an ordinary ice cream cone and two portions of ice cream commonly used in building up the common double decker cone;

Fig. 2 is a top plan view of the form shown in Fig. 1;

Fig. 3 is a vertical cross section of a modification similar to that of Fig. 1 in many respects;

Fig. 4 is a vertical cross section of a further modification;

Fig. 5 is a simplified form of the modification shown in Fig. 4;

Fig. 6 is a vertical cross section of a modification of the embodiment of Fig. 1;

Figs. 7 and 8 illustrate possible simplifications of the form of Fig. 5; and

Fig. 9 shows a still further form which is a drastic simplification of the form of Fig. 3, this form and those of Figs. 7 and 8 being, however, not considered as preferred types.

In Fig. 1 of the drawing there is illustrated the usual ice cream cone 10 which is an edible product baked from a suitable dough. As indicated in broken lines, there is disposed in the upper end of the cone 10 the usual scoop or ball A of ice cream, and an extension or auxiliary carrier 12 of this invention is mounted upon the ice cream ball A in upright position so that it may receive a second scoop or ball of ice cream illustrated in broken lines at B. For the purposes of this specification and the claims, the term "ball" is used in referring to the two portions A and B of ice cream, which commonly approximate the spherical in shape, although generally somewhat flattened as indicated. The term is intended to signify any body of ice cream of shape appropriate to be received in the upper end of the cone 10 and in the upper and lower ends of the extension carrier 12.

The ice cream cone extension and auxiliary carrier 12 shown in Figs. 1 and 2 comprises a lower cup-like member 14 and an upper cup-like member 15, these members being connected by an integral neck 16 of reduced diameter providing a communicating opening 17 between the upper and lower ice cream receiving cavities provided by the upper and lower cup-like members. This extension carrier is preferably produced from the usual edible dough commonly employed in the manufacture of ice cream cones such as the cone 10, but at least some forms may be produced from candy or the like.

The lower cup-like member 14 provides an inner concave surface whose innermost portion adjacent the neck 16 constitutes an annular seat 14a adapted to rest upon the top of the lower ice cream ball A carried in the top of the cone 10. Similarly, the upper cup-like member 15 provides an inner concave surface whose innermost portion constitutes an annular seat 15a upon which the upper ice cream ball B is adapted to rest. Beyond the seats 14a and 15a, the outermost portions of the cup-like members 14 and 15 constitute annular retaining portions indicated at 18 in both instances, and these retaining portions 18 serve for positive retention of the ice cream balls A and B against lateral displacement with respect to the carrier 12. As illustrated in Fig. 1, the ends of the extension carrier 12, that is, the outermost portions of the two cup-like members 14 and 15, constitute ice cream receiving mouths which are of substantially equal diameters, such diameters being substantially the same as the diameter of the cone 10 at its mouth which is indicated at 20. As illustrated, the mouth 20 of the cone 10 is provided with the usual bead around its periphery, and it is, therefore, preferred that the two mouths of the extension carrier 12 at the ends of the retaining portions 18 be similarly beaded as indicated at 18a. For the purpose of providing further for retention of the ice cream balls A and B properly within the cavities of the upper and lower cup-like members 14 and 15, vertically disposed, inwardly projecting ribs 21 may be formed on the inner, concave walls of either or both of the cup-like members 14 and 15. When the ice cream balls are inserted in these members, these ribs 21, which project radially inward, enter the bodies of ice cream and provide additional adhesion surfaces which further prevent the dislodgment of the ice cream balls from their respective positions.

In Fig. 3 there is illustrated a modification of the extension carrier of Fig. 1. Here, the carrier, which is indicated at 22, is provided with a lower cup-like member 24 and an upper cup-like member 25, respectively corresponding with the members 14 and 15 of the form of Fig. 1, the members 24 and 25 being integrally joined by a short neck 26 which provides a considerably reduced communicating opening 27. In this form the inner walls of the members 24 and 25 are of somewhat greater relative area than the corresponding walls of the form of Fig. 1, but they provide the same character of seats 24a and 25a, respectively, for engagement with the ice cream balls A and B. Similarly, these members 24 and 25 have at their outer ends retaining portions 28, which correspond with the retaining portions 18 of Fig. 1, these portions 28 acting positively to prevent lateral displacement of the ice cream balls. Here, also, the mouths of the cup-like members 24 and 25 are preferably beaded as indicated at 28a. If desired, either or both or neither of the members 24 and 25 may be provided with upstanding, radially directed retaining ribs 21. In this form, especially, the ribs 21 may be omitted because of the fact that the short neck 26 will ordinarily permit the two ice cream balls A and B to contact one another through the communicating opening 27, so that the resultant adhesion between the two ice cream bodies will further prevent their dislodgment.

The form of the invention shown in Fig. 4 is a still further modification. In this form the extension carrier 32 comprises upper and lower cup-like members 34 and 35 similar to those in the forms of Figs. 1 and 3, but the connecting neck 36 is disc-like and is continuous across the center portion of these cup-like members, so that there is no communicating passage between them. This arrangement further extends the seats 34a and 35a over the seats 24a and 25a of the form of Fig. 3. However, the outwardly disposed retaining portions of the cup-like members are present, as indicated at 38, their outer peripheral edges being beaded as in the other form, and as seen at 38a. In this form, the upstanding radially projecting ribs 21 are omitted. Instead, axially extending integral spurs 40 are provided, these being adapted to enter the respective bodies of ice cream.

Thus, in the forms of Figs. 1 and 4, not only do the cup-like members have retaining wall portions 18 and 38 which extend respectively upward and downward from the corresponding upper and lower seating surfaces 15a, 35a, and 14a, 34a, but they also have the upwardly and downwardly extending retaining means 21 in Fig. 1 and the upwardly and downwardly extending means 40 in Fig. 4.

In Fig. 5, there is shown a simplified modification of the form of Fig. 4. Here, the carrier 42 is in the form of a disc-like structure which is concave on both sides to provide a lower cup-like member 44 and an upper cup-like member 45, corresponding generally with the cup-like members 34 and 35 of Fig. 4, which respectively provide a lower concave seat 44a and an upper concave seat 45a for the ice cream balls A and B. Here, the connecting neck extends the full diameter of the disc-like structure and constitutes in effect a web 46 of the same diameter as the cup-like members 44 and 45. Here, also, the diameters of the members 44 and 45 are equal, and, if desired, such dimensions may be the same as the diameter of the top of the cone 10. Since the outward portions of the members 44 and 45 are limited so that the parts corresponding with the portions 38 are shallow, it is important to provide means projecting respectively upward and downward from the seats 45a and 44a in order to provide positive retention means, and this is accomplished in the form illustrated by employing the upwardly and downwardly extending spurs 40 which are used in Fig. 4.

Fig. 6 represents a modification of the form of Fig. 1 from a different aspect. Here, the inward edges of the upstanding ribs 21 of the upper cup-like member 15 are attached to an integral, cylindrical wall 50 whose upper edge 50a is disposed appreciably below the top of the upper cup-like member 15 and provides a circular seat for the ice cream ball B. The disposition of the seating edge 50a so disposes the ball B of ice cream that any of the ice cream which melts and runs down the sides of the ball B is received in an annular series of pockets 51 provided between the cylindrical wall 50 and the upper wall portions of the member 15. Such seating is accomplished by pressing the ball B of ice cream down into approximately the position shown so that the seating edge 50a enters the underside of the ice cream body, and also so that the upper edges of the upstanding ribs 21 enter corresponding portions of the ice cream body. By these means, not only is the ice cream ball B properly seated but the corresponding sloping edge portions of the upstanding ribs 21 and the contacting side portions of such ribs 21 serve adequately to retain the ice cream ball B.

Figs. 7, 8, and 9 show simple possible modifications of the auxiliary ice cream carrier here disclosed, but these forms are not to be considered as being included in a preferred group of modifications, nor as being equivalents of the forms of such preferred groups. The form of Fig. 7 comprises a disc-shaped carrier 52 having spurs 40, like the spurs 40 of Figs. 4 and 5, projecting axially downward and upward from the lower and upper portions 54 and 55 of the structure. Such portions present respectively lower and upper seating surfaces 54a and 55a against which the corresponding portions of the ice cream balls must be flattened in order to obtain good adherence. However, lateral shift of this form of carrier with respect to the balls of ice cream is satisfactorily overcome by the spurs 40.

In Fig. 8, a symmetrical spur-type structure, which may be of molded hard candy, or otherwise, is shown. As illustrated, its spurs or spines are arranged in two perpendicular planes. In use, a spur 56, which is the one directed downward, is thrust into the ice cream ball A, and a spur 57 directed upward receives the ball B. The other four spurs 58, which are in a horizontal plane, serve as a base generally corresponding with the disc-like portions 46 and 52 of the forms of Figs. 5 and 7, their under surface portions 60 serving as a seat to rest upon the ball A, and their corresponding upper surface portions serving as a seat upon which the ball B rests when impaled upon the upper spur 57.

In Fig. 9 a ring-like structure is illustrated. Here, the carrier 62 comprises a ring of substantially uniform cross section comprising a lower portion 64 and an upper portion 65, the lower portion 64 being adapted to be pressed upon the lower ice cream ball A and the upper portion 65 being adapted to receive the upper ice cream ball B thereagainst. The ring-shaped structure is formed by a central opening or passage 66 into which the lower portion of the upper ice cream ball B is adapted to project and into which the upper portion of the lower ice cream ball A is adapted to project so that the opposing portions of the two ice cream balls may come into contact with each other in much the same manner as occurs when the form of Fig. 3 is used. Here, however, the initial seating portions are provided by a circular inner shoulder 64a of the lower portion 64 of the structure and a circular inner shoulder 65a of the upper portion 65 of the structure, which shoulders are formed by the central opening 66. With this form, the upstanding side wall portions 68 of the opening 66 serve to restrict lateral shift. Thus, the body of the ring-like carrier 62 serves to fill in the annular tapering space between the two ice cream balls A and B to keep them properly positioned.

In using any of the forms of the double decker extension herein disclosed, the usual ice cream ball A, or equivalent body of ice cream, is inserted in the mouth 20 of the usual cone 10 in any conventional manner. The extension carrier, which, like the cone 10, is preferably produced from edible material, is then positioned upon the top of the ice cream ball A as represented in Fig. 1, such positioning being done with sufficient care to dispose the parts somewhat as indicated in Fig. 1. The second ball of ice cream B, or other ice cream body, is then similarly properly positioned in the mouth of the upper member of the carrier, or upon the upper surface of the carrier in the case of a structure like that shown in Figs. 5 and 7, or similarly disposed in the case of a structure like that shown in Fig. 8 or in Fig. 9. In all forms, the upper and lower seats and the upper and lower mouths of the respective extension carrier are substantially coextensive and are readily adapted for use with upper and lower ice cream bodies of the same size delivered from the same scoop. Where a structure like those shown in Figs. 1, 3, 4 and 6 is employed, the retention of the parts in the required relationship is especially positive, and more particularly is this true when the forms of Figs. 1, 3 and 4 are employed because of the fact that the ice cream ball B settles well down into the upper cup member. The retention is somewhat less positive, although satisfactory, in the case of the structure of Fig. 5 and in the case of the upper member of Fig. 6. In the case of the form of Fig. 9, fairly satisfactory results can be obtained, although, as is true of the form of Fig. 7, the effects are somewhat less positive and correspondingly somewhat less satisfactory. However, in all instances results are far preferable to the presently prevailing practice of merely mounting an upper ice cream ball B upon a lower ice cream ball A and pressing the two together, as a consequence of which the upper ball often falls off during subsequent handling.

It will be apparent, therefore, that I have presented to the trade and to the general consuming public a structure for improving and facilitating the making of double decker ice cream cones and their handling by the consumer.

It will also be apparent that the product may not only be formed from the usual baked dough but may be produced from other substances preferably those of edible nature and including candy products such as a chocolate or similarly coated hardened candy base or any hard candy without a coating.

Since other variations will no doubt occur to those skilled in this art, it is intended to protect all novel modifications.

I claim as my invention:

1. An ice cream cone extension comprising an edible support having upper and lower seating portions facing respectively upward and downward and directed outward from the center of the support and adapted respectively to engage adjacent surfaces of upper and lower balls of ice cream; and means extending respectively upward and downward from said seating portions for positive engagement with said balls of ice cream to position the upper ball in upright position above the lower ball, the upper and lower portions of said support being of substantially equal transverse dimensions and adapted to accommodate ice cream balls of substantially the same size.

2. An ice cream cone extension as in claim 1 wherein said support has upper and lower concave, cup-like members respectively providing said seating portions, and also providing certain of said means extending upward and downward.

3. A separate ice cream cone extension comprising: an edible support having upper and lower portions facing respectively upward and downward and extending radially outward, said upper and lower portions respectively providing seating surfaces likewise extending radially outward for engagement respectively with adjacent surfaces of balls of ice cream; and means extending respectively upward and downward from said surfaces to provide for positive engagement with said balls of ice cream whereby to retain an upper ice cream ball in upright position above a lower ice cream ball.

4. An ice cream cone extension as in claim 3 wherein said upper and lower portions are cup-like in construction, said seating surfaces being thereby concave.

5. An ice cream cone extension as in claim 4 wherein the outer diameters of said cup-like portions are substantially equal to accommodate ice cream balls of substantially the same size.

6. An ice cream cone extension as in claim 3 wherein the outermost diameters of said upper and lower portions are substantially equal.

7. An ice cream cone extension as in claim 3 wherein said upper and lower portions are of cuplike construction providing inner concave surfaces to engage said ice cream balls, the innermost portions of said concave surfaces providing said seating surfaces and the outermost portions of said concave surfaces constituting at least certain of said means extending upward and downward whereby to engage positively the sides of the said ice cream balls.

8. An ice cream cone extension as in claim 7 wherein the outermost diameter of said lower portion is substantially the same as the diameter of the ice cream receiving end of the ice cream cone upon which the extension is used.

9. An ice cream cone extension in the form of an edible carrier adapted to be carried at the upper end of an ordinary ice cream cone and to be supported on a first ball of ice cream carried in said cone, said carrier comprising: a lower transversely directed, downwardly facing surface means extending substantially uniformly outward from the center of said carrier and adapted to seat upon said first ball of ice cream in said cone; upper transversely directed, upwardly facing surface means extending substantially uniformly outward from the center of said carrier and adapted to receive and support thereon a second ball of ice cream; upper retaining means connected with said upper surface means and extending upward therefrom for positively engaging and retaining said second ball of ice cream on said upper wall means; and lower retaining means connected with said lower surface means and extending downward therefrom for positively engaging said first ball of ice cream and thereby positively retaining said carrier upon said first ball of ice cream.

10. An ice cream carrier as in claim 9 wherein said upper and lower surface means are in the form of cup-like members, the lower of which is adapted to seat over said first ball of ice cream and the upper of which is adapted to receive said second ball of ice cream.

11. An ice cream carrier as in claim 10 wherein the outer diameter of the lower cuplike member is substantially the same as the diameter of the top of the ice cream cone upon which the carrier is mounted.

12. An ice cream carrier as in claim 11 wherein the outer diameter of the upper cup-like member is substantially the same as the corresponding diameter of the lower cup-like member.

13. An ice cream carrier as in claim 9 wherein the greatest dimensions of the upper and lower surface means are their outermost dimensions and such dimensions are substantially equal.

14. An ice cream carrier as in claim 9 wherein the greatest dimensions of said upper and lower surface means are outermost diameters thereof, and the greatest diameter of the lower wall means is substantially coextensive with the diameter of the cone upon which it is mounted.

15. In combination: an edible ice cream cone having an open upper portion adapted to receive a first ball of ice cream; a separate edible supporting extension having upper and lower portions having upper and lower seats, respectively facing upward and downward, the lower seat being adapted to engage with said first ball of ice cream, and the upper seat being adapted to receive and support a second ball of ice cream, said seats extending radially outward from the center of said extension; positioning means depending from said lower portion for positively engaging said first ball of ice cream and maintaining the position of said support upon said first ball of ice cream; and positioning means upstanding from said upper portion for positively engaging said second ball of ice cream and maintaining said second ball of ice cream in upright position above said first ball of ice cream.

16. A combination as in claim 15 wherein said upper and lower portions are of cup-like construction and provide concave inner walls, the innermost portions of said concave walls constituting said seats and the outermost portions of said concave walls constituting, at least in part, said positioning means.

17. A combination as in claim 15 wherein the outermost portions of said upper and lower portions have substantially the same diameter.

18. A combination as in claim 15 wherein the outermost portions of said upper and lower portions represent their greatest diameters, and the greatest diameter of said lower portion is substantially the same as the greatest diameter of said ice cream cone.

19. A combination as in claim 16 wherein the greatest diameter of said lower cup-like member is at its mouth, and such diameter is substantially the same as the greatest diameter of the ice cream cone.

20. A combination as in claim 15 wherein said positioning means comprise spur means projecting from said seat means.

21. In combination: an edible ice cream cone having an open upper portion; a first ice cream ball disposed in said upper portion and extending thereabove; a cone extension supported upon said ice cream ball and having lower seat means facing downward and engaging said ball and positioning said extension thereon, said extension also having upper seat means; and a second ball of ice cream carried upon the upper side of said extension on said upper seat means facing upward, said upper seat means retaining and positioning said second ball of ice cream above said first ice cream ball.

ADAM L. HABLER.

REFERENCES CITED

The following references are of record in the file of this patent:

UNITED STATES PATENTS

| Number | Name | Date |
|---|---|---|
| 1,794,238 | McKibben | Feb. 24, 1931 |
| 1,931,413 | Notkin | Oct. 17, 1933 |

Certificate of Correction

Patent No. 2,527,993                                October 31, 1950

ADAM L. HABLER

It is hereby certified that error appears in the printed specification of the above numbered patent requiring correction as follows:

Column 8, lines 53 and 54, strike out the words "facing upward" and insert the same in line 51, after "means" and before the semicolon;

and that the said Letters Patent should be read as corrected above, so that the same may conform to the record of the case in the Patent Office.

Signed and sealed this 16th day of January, A. D. 1951.

[SEAL]

THOMAS F. MURPHY,
*Assistant Commissioner of Patents.*